United States Patent
Döhring

[11] Patent Number: 6,086,474
[45] Date of Patent: Jul. 11, 2000

[54] VENTILATION DEVICE FOR A MOTOR VEHICLE

[75] Inventor: Klaus Döhring, Aschaffenburg, Germany

[73] Assignee: Mannesmann VDO AG, Frankfurt, Germany

[21] Appl. No.: 09/284,779

[22] PCT Filed: Oct. 6, 1997

[86] PCT No.: PCT/EP97/05477

§ 371 Date: Apr. 16, 1999

§ 102(e) Date: Apr. 16, 1999

[87] PCT Pub. No.: WO98/17489

PCT Pub. Date: Apr. 30, 1998

[30] Foreign Application Priority Data

Oct. 21, 1996 [DE] Germany ............... 196 43 285

[51] Int. Cl.[7] .................................................. B60H 1/24
[52] U.S. Cl. ............................................. 454/143; 454/162
[58] Field of Search ........................... 454/139, 143, 454/145, 146, 148, 158, 162, 164, 165

[56] References Cited

U.S. PATENT DOCUMENTS 4,512,239  4/1985  Watanabe et al. ................ 454/144
5,167,129  12/1992  Hitoshi .
5,261,855  11/1993  Law et al. .
5,733,190  3/1998  Wahab ............................. 454/164

FOREIGN PATENT DOCUMENTS 2537886   3/1977   Germany ................ 454/162
3533069   3/1987   Germany ................ 454/162
3813548  11/1989   Germany .
92213    5/1984   Japan ...................... 454/158
59-118523  9/1984  Japan ...................... 454/158

*Primary Examiner*—Harold Joyce
*Assistant Examiner*—Derek S. Boles
*Attorney, Agent, or Firm*—Martin A. Farber

[57] ABSTRACT

A ventilating device (1) for a motor vehicle, having a ventilation opening (5) arranged in the central region of an instrument panel (2) and/or a ventilation opening (5) arranged in a center, console which can be connected optionally to a suction side or a pressure side of a fan having an air filter. Ventilation openings arranged in a lateral region of the instrument panel (2) can be connected to the pressure side of the fan. This makes it possible for air which has been used, for example, by a smoker in the front region of the motor vehicle to be cleaned particularly quickly.

8 Claims, 5 Drawing Sheets

VENTILATION DEVICE FOR A MOTOR VEHICLE

FIELD AND BACKGROUND OF THE INVENTION

The invention relates to a ventilating device for a motor vehicle, having an air filter, having a fan and having a plurality of ventilation openings which can be connected to the fan, are provided for the ventilation of the motor vehicle and are arranged in a central region and in a lateral region of an instrument panel (dashboard).

Such ventilating devices are often used in motor vehicles nowadays and are thus known. The ventilating device usually has a multiplicity of ventilation openings in the instrument panel, or in the vicinity thereof, and in a footwell of the motor vehicle. The ventilating device takes in fresh air through a fresh-air opening arranged on the outside of the motor vehicle and feeds it, by means of the fan, to the ventilation openings arranged in the motor vehicle. It is often possible to feed fresh air from the fresh-air opening into the motor vehicle by a changeover flap or to change the fan to a circulating-air feed, in the case of which the air is taken in in the footwell of the motor vehicle and fed, via the air filter, to the ventilation openings in the instrument panel. It is also known for at least individual ventilation openings, with the fan being bypassed, to be connected directly to a fresh-air opening arranged on the outside of the motor vehicle and for said ventilation openings to have fresh air admitted to them directly when the vehicle is moving forward.

The disadvantage with the known ventilating device is that it usually takes a very long time to exchange the stale air in the motor vehicle. In particular if an occupant is smoking in the front region of the vehicle, this means that the stale air is in the vicinity of the instrument panel, or above the latter, and, in the case of the known ventilating device, is mixed, by way of the air blown in through the ventilation openings of the instrument panel, with the rest of the air in the passenger compartment.

It would be possible to envisage providing separate ventilation openings, connected to a dedicated fan, in the motor vehicle. It would then be possible for the fan to extract the stale air from the passenger compartment of the motor vehicle through the separate ventilation openings. However, such a ventilating device is highly complex in structural terms and requires a large amount of space for the installation of ventilating ducts.

SUMMARY OF THE INVENTION

It is an object to the invention to provide a ventilating device for a motor vehicle such that it extracts stale air in the vicinity of the instrument panel and/or of a center console of the motor vehicle as quickly as possible and is not highly complex in structural terms.

According to the invention some of the ventilation openings arranged in or on the instrument panel and/or at least some of the ventilation openings arranged in a center console can be connected optionally (selectively) to the suction side or the pressure side of the fan by means of a valve.

This formation means that, in accordance with the position of the valve, either all the ventilation openings are connected to the pressure side of the fan or directly to the fresh-air opening or some of the ventilation openings are connected to the suction side and the rest are connected to the pressure side of the fan or directly to the fresh-air opening. As a result, stale air can be taken in through the ventilation openings connected to the suction side of the fan and blown out at the rest of the ventilation openings. This produces, in the vicinity of the instrument panel and/or of the center console, a small amount of air circulation, by means of which the stale air in the front region of the motor vehicle is extracted particularly quickly and virtually without being mixed with the rest of the air present in the passenger compartment. Since there is no need for a second fan or additional ventilation openings, the structural complexity for the ventilating device according to the invention is only negligibly higher than for the known ventilating device.

Side windows of the motor vehicle are prevented from misting up, which could be a result of stale air flowing past said windows, where the ventilation openings arranged in the central region of the instrument panel and/or the ventilation openings arranged in the center console are connectable to the suction side of the fan. Furthermore, this formation has the advantage of preferably extracting stale air in the vicinity of an ashtray arranged in the instrument panel or in a center console.

For the purpose of filtering the air, it would be possible to use in each case an air filter for taking in air from the footwell and for taking in air from the ventilation openings in the instrument panel and/or in the center console. However, according to another advantageous development of the invention, the ventilating device is configured particularly cost-effectively where the air filter is arranged directly upstream or downstream of the fan.

According to another advantageous development of the invention, the ventilating device can be used particularly easily where the central ventilation opening, a ventilation opening in the footwell and a fresh-air opening, which is arranged on the outside of the motor vehicle, each have a valve, it being possible for said valve to be activated via a common control device. As a result, activation of a single adjusting element, for example a lever, makes it possible for air to be taken in optionally from outside the motor vehicle or from a ventilation opening in the instrument panel and/or in the center console or from the footwell.

According to another advantageous development of the invention, the control device is formed in a particularly simplified construction where it has a Bowden cable which couples the valves to one another.

The valves could be designed, for example, in each case as flaps which can be opened individually. According to another advantageous development of the invention, however, the ventilating device is of low structural complexity, and can thus be produced particularly cost-effectively, where a single valve is constructed for optionally connecting the central ventilation opening, the ventilation opening in the footwell or the fresh-air opening to the suction side of the fan.

According to another advantageous development of the invention, the ventilating device can be produced particularly cost-effectively where a plurality of valves have a common housing with a common slide. Furthermore, intermediate stages can be produced particularly easily by way of the slide. By virtue of the intermediate stages, it is possible, for example, for stale air to be extracted through one of the ventilation openings and, before being returned into the passenger compartment, mixed with fresh air taken in through the fresh-air opening.

According to another advantageous development of the invention, the ventilating device according to the invention is constructed particularly simplified where the suction side of the fan is connected, via a bypass duct, to a duct which is routed from the pressure side of the fan to the ventilation openings, and where the valve is designed for automatically closing the duct in the case of a negative pressure in the bypass duct.

BRIEF DESCRIPTION OF THE DRAWINGS

With the above and other objects in view, the invention will be understood from the accompanying description of preferred embodiments when considered with the accompanying drawings, of which.

DETAILED DESCRIPTION OF THE PREFERRED EMBODIMENTS

Figure 1:
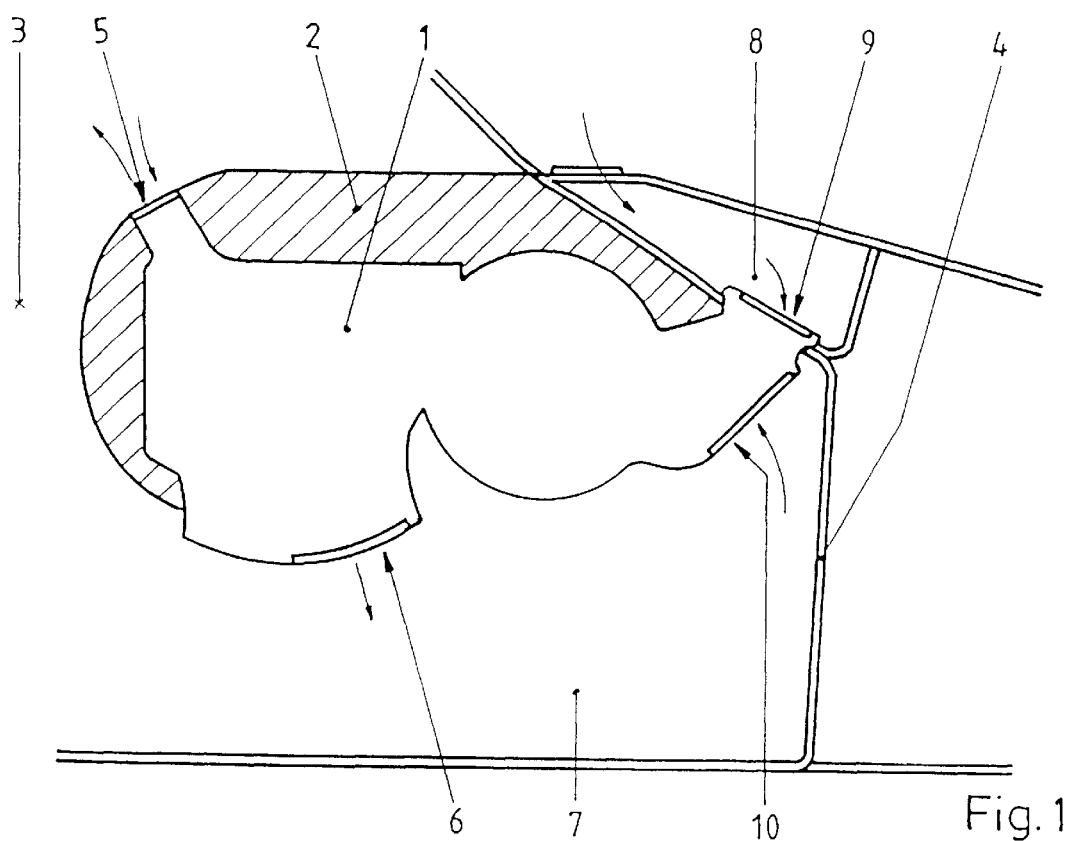
FIG. 1 shows a partial section through a front region of a motor vehicle with a ventilating device according to the invention.

FIG. 1 shows a ventilating device 1 which is fastened in a motor vehicle. The ventilating device 1 is arranged in an instrument panel (dashboard) 2 of the motor vehicle, behind an end wall 4 which bounds a passenger compartment 3 toward the front. The ventilating device 1 has a ventilation opening 5, which is arranged in the central region of the instrument panel 2, and a further ventilation opening 6, which blows out air into a footwell 7 of the motor vehicle. Through the ventilation opening 5 arranged in the central region of the instrument panel 2, air can optionally be blown into the passenger compartment 3 of the motor vehicle or extracted therefrom. Furthermore, the ventilating device 1 has a fresh-air opening 9, which is arranged in a water tank 8 fastened in front of the end wall 4, and a circulating-air opening 10. The fresh-air opening 9 takes in air from the outside of the motor vehicle. For illustrative purposes, the flow of the air is indicated by arrows in the drawing. Through the circulating-air opening 10, air is taken in from the footwell 7 of the motor vehicle by the ventilating device 1.

Figure 2:
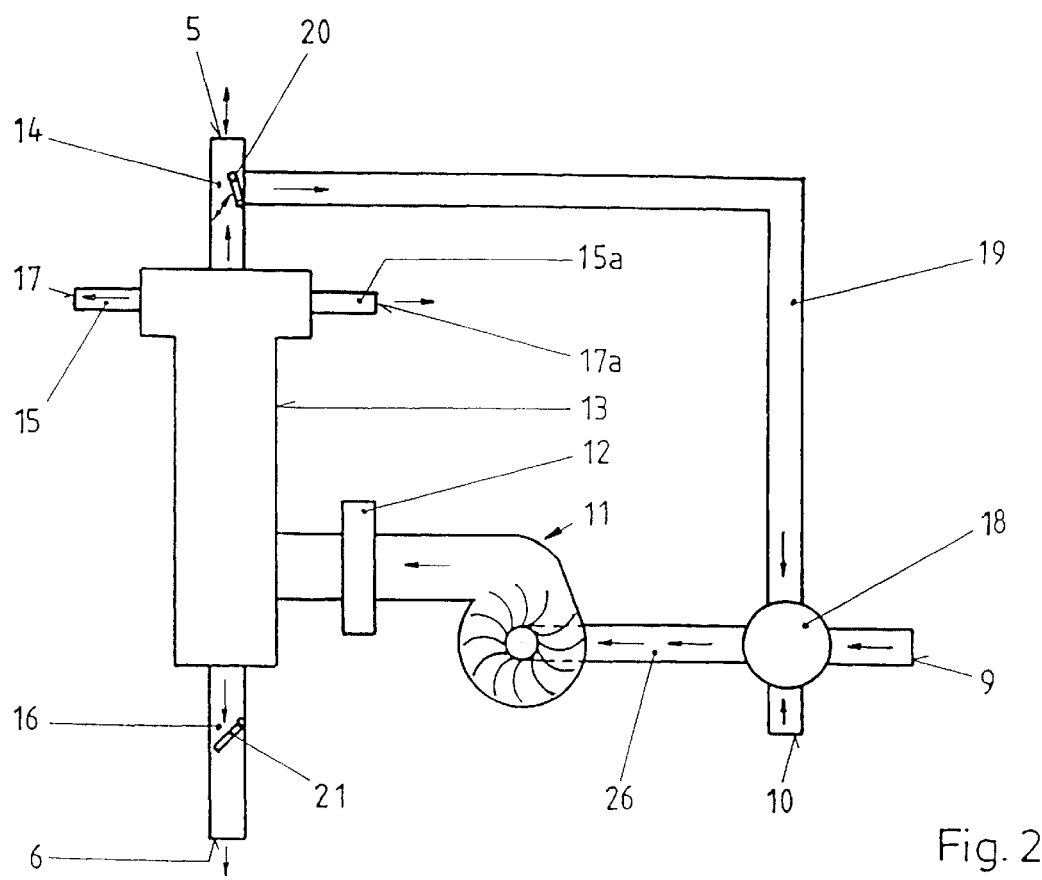
FIG. 2 shows a schematic diagram of the ventilating device according to the invention from FIG. 1.

FIG. 2 shows schematically the ventilating device 1 according to the invention from FIG. 1. The ventilating device 1 has a fan 11 and an air-distributing box 13 which is arranged on the pressure side of the fan 11, downstream of an air filter 12. From the air-distributing box 13, in each case one duct 14–16 is routed to the central ventilation opening 5 and to two lateral ventilation openings 17, 17a in the instrument panel 2, and to the ventilation opening 6, which is arranged in the footwell 7 of the motor vehicle. The ventilating device 1 also has a valve 18, by means of which the suction side of the fan 11 can be connected to the central ventilation opening 5, the circulating-air opening 10 or the fresh-air opening 9. The central ventilation opening 5 is connected to the valve 18 by means of a bypass duct 19.

The central ventilation opening 5 can be changed over from suction-intake operation to blowing-out operation by means of a valve 20, which is formed as a changeover flap. The ventilation opening 6 in the footwell 7 can be closed off by means of a further valve 21. This can be used in order to avoid a flow short circuit from the ventilation opening 6 in the footwell 7 to the circulating-air opening 10. Changeover of the valve 20, which is formed as a changeover flap, to suction-intake operation of the central ventilation opening 5, and connection of the central ventilation opening 5 to the suction side of the fan 11 by the valve 18, produces, in the central region of the instrument panel 2, a small amount of air circulation, by means of which stale air is extracted from a front region of the passenger compartment 3 of the motor vehicle.

Figure 3:
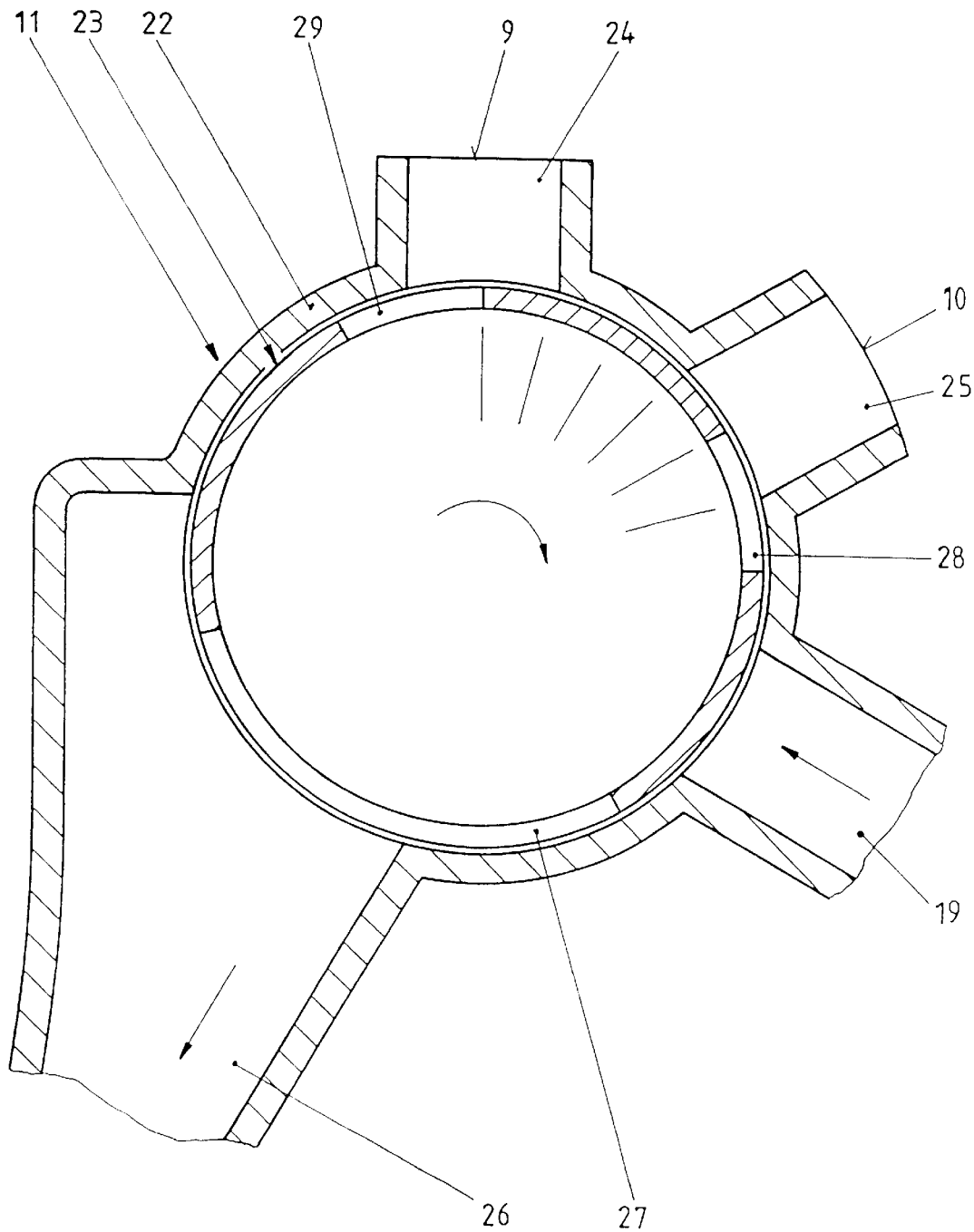
FIG. 3 shows a valve from FIG. 2 with a common, rotatable slide.

The valve 18 from FIG. 2 is illustrated schematically in FIG. 3. The valve 18 has a housing 22 in which a drum-like slide 23 is mounted in a rotatable manner. A fresh-air duct 24, which is routed to the fresh-air opening 9, a circulating-air duct 25, which is routed to the circulating-air opening 10 in the footwell 7 of the motor vehicle, the bypass duct 19 and a duct 26, which is routed to the suction side of the fan 11, pass through the housing 22. The slide 23 has three openings 27–29. The opening 27 allows an overflow of air from the center of the valve 18 to the suction side of the fan 11. The other two openings 28, 29 control the fresh-air duct 24, the circulating-air duct 25 and the bypass duct 19.

In the depicted basic position of the valve 18, the fresh-air duct 24 and the circulating-air duct 25 are each half open by way of two of the openings 28, 29 of the slide 23. Air is thus taken in through half of the circulating-air opening 10 and of the fresh-air opening 9. If the slide 23 is rotated through 15° in the clockwise direction, the circulating-air duct 25 is closed and the fresh-air duct 24 is completely open. If the slide 23 is rotated further in the clockwise direction, the fresh-air duct 24 is closed and, at the same time, the bypass duct 19 is opened. If the slide 23 is rotated through 45°, the bypass duct 19 is fully open, while the fresh-air duct 24 and the circulating-air duct 25 are closed. If the slide 23 is rotated further, the bypass duct 19 is closed, while, at the same time, the circulating-air duct 25 is opened until such time as, with the rotation of the slide 23 through 75°, it is completely open.

By means of said valve 18, it is possible to connect each of the ducts 19, 24, 25 individually to the suction side of the fan 11 and to produce all the intermediate stages for mixing the air taken in. The valve 20, which is illustrated in FIG. 2, is formed as a changeover flap and is intended for controlling the central ventilation opening 5, and the valve 21, which is likewise illustrated in FIG. 2 and is intended for controlling the ventilation opening 6 in the footwell 7 from FIG. 1, may be controlled, for example, automatically by a negative pressure in the circulating-air duct 25 and the bypass duct 19.

Figure 4:
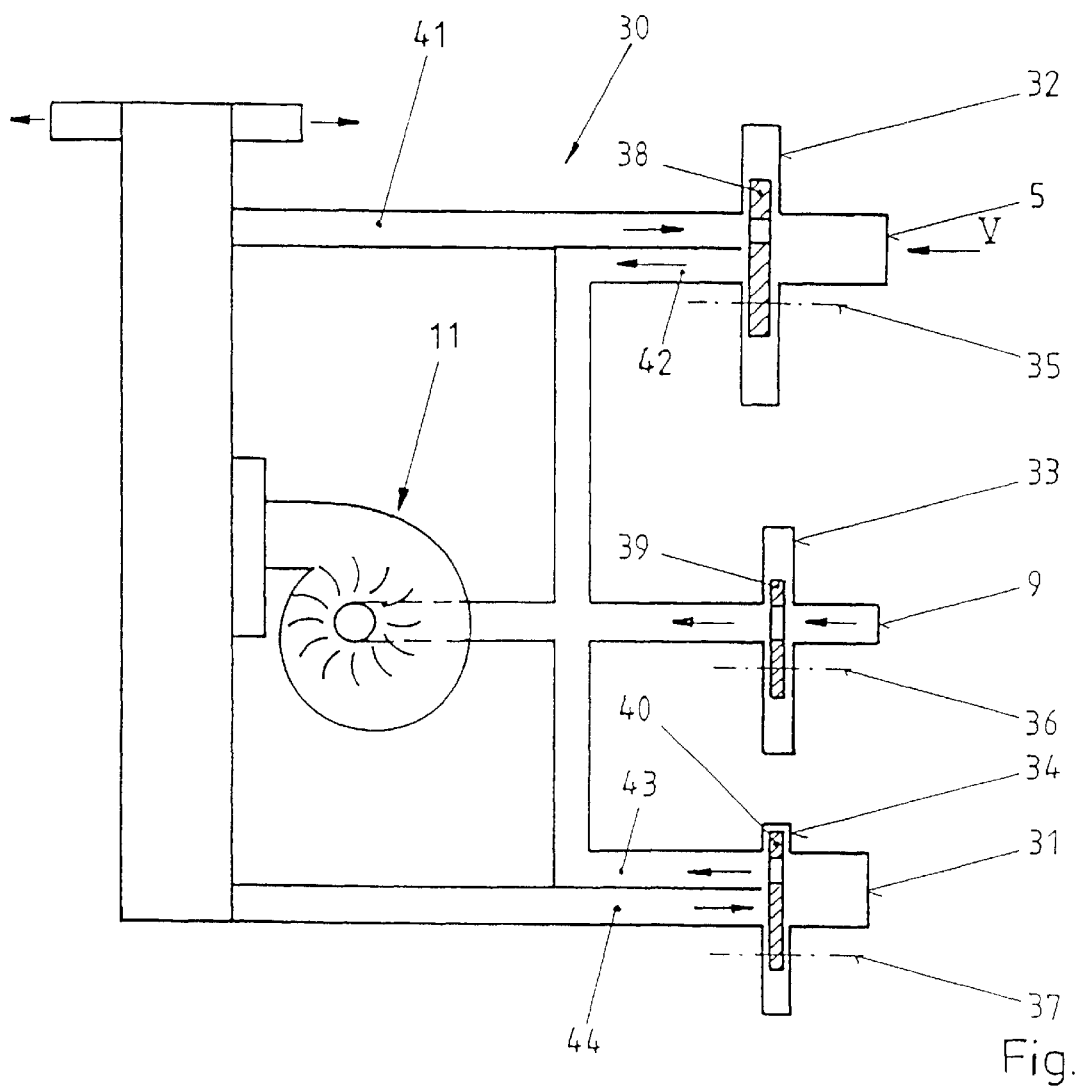
FIG. 4 shows a diagram of a second embodiment of the ventilating device according to the invention.

FIG. 4 shows schematically a ventilating device 30, in the case of which the central ventilation opening 5, the fresh-air opening 9 and an opening 31 in the footwell 7 which is illustrated in FIG. 1, can be activated by in each case one valve 32–34. The valves 32–34 each have a rotary slide 38–40, which can be pivoted about an axis 35–37. The valves 32, 34 of the central ventilation opening 5 and the opening 31 in the footwell each have a duct 41–44 routed to them from the pressure side and the suction side of the fan 11.

Figure 5:
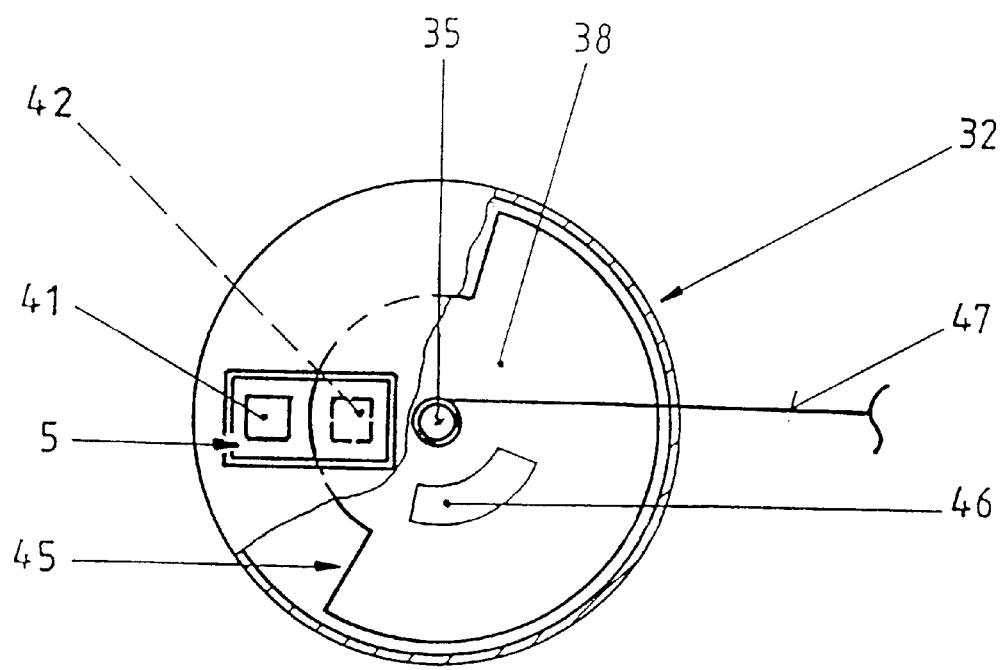
FIG. 5 shows a view of a ventilation opening from the position V from FIG. 4.

The valve 32 of the central ventilation opening 5 is illustrated in partial section in FIG. 5. For the purpose of controlling the ducts 41, 42, the rotary slide 38 has a border 45 and a slot 46. Rotation of the rotary slide 38 thus optionally connects the duct 41, which is connected to the pressure side, or the duct 42, which is connected to the suction side, to the ventilation opening 5, or it is possible for both ducts 41, 42 to be closed off at the same time. The rotary slide 38 can be adjusted by a Bowden cable 47. The valves 32, 34 shown in FIG. 4 may be activated, for example, by a common Bowden cable or by a dedicated Bowden cable in each case.

I claim:

1. A ventilating device for a motor vehicle having a passenger compartment with an instrument panel located at a front of the passenger compartment, the ventilating device comprising an air filter, a fan, a valve, and a plurality of ventilation openings which are connectable to the fan for ventilation of the motor vehicle; and wherein the ventilation openings are located in the front of the passenger compartment with locations of at least a portion of the ventilation openings being arranged in a central region and in a lateral region of said instrument panel, and some of the ventilation openings are connectable selectively to a suction side or a pressure side of the fan by said valve.

2. The ventilating device as claimed in claim 1, wherein some of the ventilation openings are arranged in a central region of the instrument panel and in a center console, and are connectable to the suction side of the fan by said valve.

3. The ventilating device as claimed in claim 1, wherein the air filter is connected directly upstream or downstream of the fan.

4. The ventilating device as claimed in claim 1, wherein a central ventilation opening of said ventilation openings, an opening of said ventilation openings in a footwell of the vehicle, and a fresh-air opening located on the outside of the motor vehicle are connected by separagely operable elements of said valve, and wherein the ventilating device further comprises a common control device for activating said valve elements.

5. The ventilating device as claimed in claim 4, wherein said control device has a Bowden cable which couples the valve elements to one another.

6. The ventilating device as claimed in claim 1, wherein said valve is a single valve selectively connecting a central ventilation opening of said ventilation openings, a ventilation opening of said ventilation openings in a footwell of the vehicle, or a fresh-air opening to the suction side of the fan.

7. The ventilating device as claimed in claim 1, wherein said valve comprises a plurality of valve elements sharing a common housing with a common slide operatively mounted in said common housing.

8. The ventilating device as claimed in claim 1, further comprising a bypass duct, wherein the suction side of the fan is connected, via said bypass duct, to a further duct which is routed from the pressure side of the fan to the ventilation openings, and the valve automatically closes the further duct in case of a negative pressure in the bypass duct.

* * * * *